(12) United States Patent
Uno

(10) Patent No.: US 12,145,624 B2
(45) Date of Patent: Nov. 19, 2024

(54) VEHICLE ASSIST SERVER, PROCESSING METHOD FOR VEHICLE ASSIST SERVER, AND STORAGE MEDIUM

(71) Applicant: TOYOTA JIDOSHA KABUSHIKI KAISHA, Toyota (JP)

(72) Inventor: Satoshi Uno, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 308 days.

(21) Appl. No.: 17/815,616

(22) Filed: Jul. 28, 2022

(65) Prior Publication Data

US 2023/0101031 A1 Mar. 30, 2023

(30) Foreign Application Priority Data

Sep. 28, 2021 (JP) ................. 2021-157543

(51) Int. Cl.
*B60W 60/00* (2020.01)
*B60W 40/103* (2012.01)
*B60W 40/105* (2012.01)
*B60W 40/114* (2012.01)

(52) U.S. Cl.
CPC ...... *B60W 60/0015* (2020.02); *B60W 40/103* (2013.01); *B60W 40/105* (2013.01); *B60W 40/114* (2013.01); *B60W 2520/105* (2013.01); *B60W 2520/14* (2013.01); *B60W 2520/26* (2013.01); *B60W 2556/10* (2020.02); *B60W 2556/40* (2020.02)

(58) Field of Classification Search
CPC ....... B60W 2520/105; B60W 2520/14; B60W 2520/26; B60W 2556/10; B60W 2556/40; B60W 40/103; B60W 40/105; B60W 40/114; B60W 60/0015
See application file for complete search history.

(56) References Cited

U.S. PATENT DOCUMENTS

| | | | |
|---|---|---|---|
| 11,521,396 B1* | 12/2022 | Jain | G06F 18/2415 |
| 11,526,711 B1* | 12/2022 | Cardona | B60W 40/06 |
| 11,780,472 B2* | 10/2023 | Li | G06N 3/045 |
| | | | 701/23 |
| 2020/0098203 A1 | 3/2020 | Uno | |
| 2022/0194420 A1* | 6/2022 | Chu | B60W 60/0015 |
| 2022/0250639 A1* | 8/2022 | Ariannezhad | B60W 40/09 |
| 2022/0291690 A1* | 9/2022 | Goyal | B60W 60/001 |
| 2022/0348222 A1* | 11/2022 | Zhao | G01C 21/3415 |
| 2023/0001955 A1* | 1/2023 | Switkes | B60W 60/0011 |

(Continued)

FOREIGN PATENT DOCUMENTS

| | | | |
|---|---|---|---|
| JP | 2007257421 A | 10/2007 | |
| JP | 2012194761 A | 10/2012 | |
| JP | 2013544695 A | 12/2013 | |

(Continued)

*Primary Examiner* — Jaime Figueroa
*Assistant Examiner* — Zachary Joseph Wallace
(74) *Attorney, Agent, or Firm* — Dickinson Wright, PLLC

(57) ABSTRACT

A vehicle assist server performs a vehicle assist for an object vehicle using a previously generated assist content, based on object vehicle data including a traveling state of the object vehicle and position information about the object vehicle on a map. The vehicle assist server includes a prevalence degree estimation unit, a prevalence degree determination unit, and a registration unit.

4 Claims, 9 Drawing Sheets

(56) References Cited

U.S. PATENT DOCUMENTS

2023/0142252 A1\* 5/2023 Bergquist ............ B60W 40/105
　　　　　　　　　　　　　　　　　　　　701/23

FOREIGN PATENT DOCUMENTS

| JP | 2018205971 A | 12/2018 |
| JP | 2020052607 A | 4/2020 |
| WO | 2012047743 A2 | 4/2012 |

\* cited by examiner

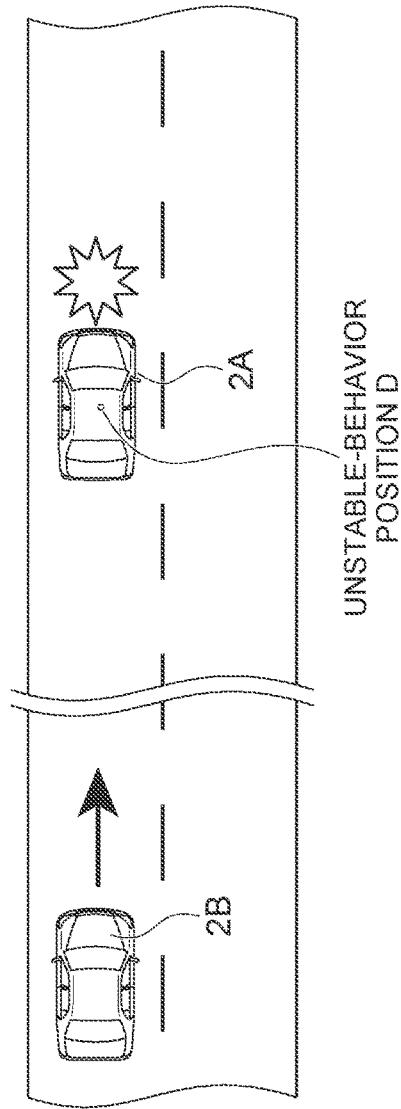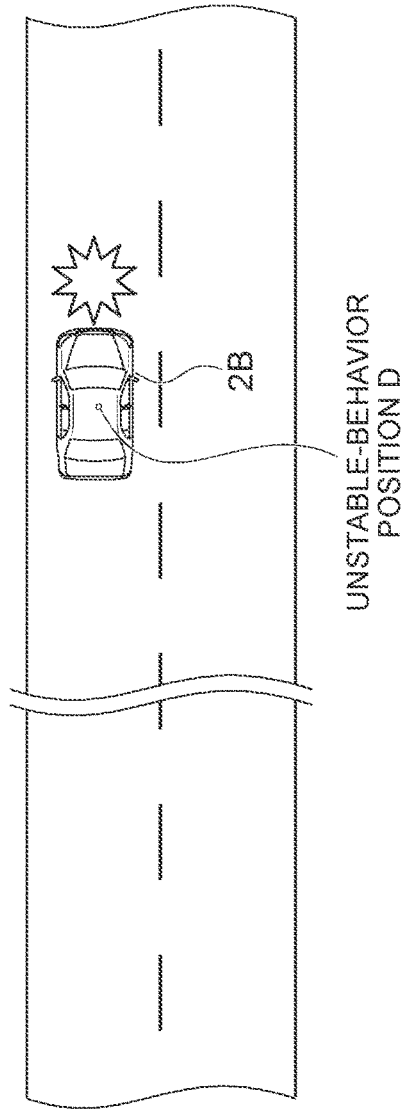

VEHICLE ASSIST SERVER, PROCESSING METHOD FOR VEHICLE ASSIST SERVER, AND STORAGE MEDIUM

CROSS-REFERENCE TO RELATED APPLICATION

This application claims priority to Japanese Patent Application No. 2021-157543 filed on Sep. 28, 2021, incorporated herein by reference in its entirety.

BACKGROUND

1. Technical Field

The present disclosure relates to a vehicle assist server, a processing method for the vehicle assist server, and a storage medium.

2. Description of Related Art

Regarding information processing relevant to traveling of a vehicle, for example, Japanese Unexamined Patent Application Publication (Translation of PCT Application) No. 2013-544695 (JP 2013-544695 A) is known. This publication shows a process of reporting a zone where a driver thinks that autonomous traveling is not safe in traveling of an autonomous driving vehicle, to other near vehicles.

SUMMARY

It is discussed to collect position information about a position where a vehicle has performed an unstable behavior, in association with the unstable behavior, and to perform various vehicle assists for a vehicle that travels in the vicinity of the position. However, when all information is evenly used for the vehicle assist, the processing load on a server increases. Therefore, it is desired to appropriately select a content that is used for the vehicle assist.

An aspect of the present disclosure is a vehicle assist server that performs a vehicle assist for an object vehicle using a previously generated assist content, based on object vehicle data including a traveling state of the object vehicle and position information about the object vehicle on a map, the vehicle assist server including: a prevalence degree estimation unit configured to estimate an object vehicle prevalence degree for each of a plurality of previously set setting areas, based on the object vehicle data about the plurality of setting areas; a prevalence degree determination unit configured to determine whether the object vehicle prevalence degree for a corresponding setting area of the plurality of setting areas is equal to or higher than a necessary prevalence degree for each of a plurality of kinds of the assist contents, based on the object vehicle prevalence degree for the corresponding setting area and the necessary prevalence degree, the necessary prevalence degree being previously set for each of the plurality of kinds of assist contents; and a registration unit configured to register the assist content for which the prevalence degree determination unit determines that the object vehicle prevalence degree is equal to or higher than the necessary prevalence degree, in a database, as the assist content that is a provision object in the corresponding setting area.

With the vehicle assist server according to the aspect of the present disclosure, the assist content for which the object vehicle prevalence degree for the setting area is equal to or higher than the necessary prevalence degree is registered in the database as the assist content that is the provision object in the setting area. Therefore, it is possible to avoid the vehicle assist using the assist content based on the object vehicle data from being performed in the setting area for which the object vehicle prevalence degree is not sufficient, and it is possible to restrain the increase in processing load due to the provision of an unnecessary assist content to the object vehicle.

The vehicle assist server according to the aspect of the present disclosure may further include an assist content generation unit configured to generate the assist content based on the object vehicle data, in which: the assist content generation unit generates a single-vehicle estimation type content and a multiple-vehicle estimation type content as the assist content, the single-vehicle estimation type content being generated from the object vehicle data about one object vehicle, the multiple-vehicle estimation type content being generated from the object vehicle data about a plurality of object vehicles; and the necessary prevalent degree for the multiple-vehicle estimation type content is higher than the necessary prevalent degree for the single-vehicle estimation type content.

In many cases, the single-vehicle estimation type content generated from the object vehicle data about one object vehicle is higher in the need of the vehicle assist than the multiple-vehicle estimation type content generated from the object vehicle data about a plurality of object vehicles. With this vehicle assist server, the necessary prevalent degree for the multiple-vehicle estimation type content is higher than the necessary prevalent degree for the single-vehicle estimation type content, and thereby it is possible to preferentially provide the single-vehicle estimation type content to the object vehicle.

In the vehicle assist server according to the aspect of the present disclosure, the assist content generation unit may generate a different-time multiple-vehicle estimation type content and an identical-time multiple-vehicle estimation type content as the multiple-vehicle estimation type content, the different-time multiple-vehicle estimation type content being generated from the object vehicle data about a plurality of the object vehicles that pass through an identical position at different times, the identical-time multiple-vehicle estimation type content being generated from the object vehicle data about a plurality of the object vehicles that exist at an identical position at an identical time, and the necessary prevalent degree for the identical-time multiple-vehicle estimation type content may be higher than the necessary prevalent degree for the different-time multiple-vehicle estimation type content.

In many cases, the different-time multiple-vehicle estimation type content generated from the object vehicle data about a plurality of object vehicles that pass through an identical position at different times is higher in the need of the vehicle assist than the identical-time multiple-vehicle estimation type content generated from the object vehicle data about a plurality of object vehicles that exist at an identical position at an identical time. With this vehicle assist server, the necessary prevalent degree for the identical-time multiple-vehicle estimation type content is higher than the necessary prevalent degree for the different-time multiple-vehicle estimation type content, and thereby it is possible to preferentially provide the different-time multiple-vehicle estimation type content to the object vehicle.

Another aspect of the present disclosure is a storage medium storing a program that causes a vehicle assist server to operate, the vehicle assist server performing a vehicle assist for an object vehicle using a previously generated assist content, based on object vehicle data including a traveling state of the object vehicle and position information about the object vehicle on a map, the vehicle assist server operating as: a prevalence degree estimation unit configured to estimate an object vehicle prevalence degree for each of a plurality of previously set setting areas, based on the object vehicle data about the plurality of setting areas; a prevalence degree determination unit configured to determine whether the object vehicle prevalence degree for a corresponding setting area of the plurality of setting areas is equal to or higher than a necessary prevalence degree for each of a plurality of kinds of the assist contents, based on the object vehicle prevalence degree for the corresponding setting area and the necessary prevalence degree, the necessary prevalence degree being previously set for each of the plurality of kinds of assist contents; and a registration unit configured to register the assist content for which the prevalence degree determination unit determines that the object vehicle prevalence degree is equal to or higher than the necessary prevalence degree, in a database, as the assist content that is a provision object in the corresponding setting area.

With the storage medium according to the aspect of the present disclosure, the assist content for which the object vehicle prevalence degree for the setting area is equal to or higher than the necessary prevalence degree is registered in the database as the assist content that is the provision object in the setting area. Therefore, it is possible to avoid the vehicle assist using the assist content based on the object vehicle data from being performed in the setting area for which the object vehicle prevalence degree is not sufficient, and it is possible to restrain the increase in processing load due to the provision of an unnecessary assist content to the object vehicle.

Further, another aspect of the present disclosure is a processing method for a vehicle assist server, the vehicle assist server performing a vehicle assist for an object vehicle using a previously generated assist content, based on object vehicle data including a traveling state of the object vehicle and position information about the object vehicle on a map, the processing method including: a prevalent degree estimation step of estimating an object vehicle prevalence degree for each of a plurality of previously set setting areas, based on the object vehicle data about the plurality of setting areas; a prevalence degree determination step of determining whether the object vehicle prevalence degree for a corresponding setting area of the plurality of setting areas is equal to or higher than a necessary prevalence degree for each of a plurality of kinds of the assist contents, based on the object vehicle prevalence degree for the corresponding setting area and the necessary prevalence degree, the necessary prevalence degree being previously set for each of the plurality of kinds of assist contents; and a registration step of registering the assist content for which it is determined in the prevalence degree determination step that the object vehicle prevalence degree is equal to or higher than the necessary prevalence degree, in a database, as the assist content that is a provision object in the corresponding setting area.

With the processing method for the vehicle assist server according to the aspect of the present disclosure, the assist content for which the object vehicle prevalence degree for the setting area is equal to or higher than the necessary prevalence degree is registered in the database as the assist content that is the provision object in the setting area. Therefore, it is possible to avoid the vehicle assist using the assist content based on the object vehicle data from being performed in the setting area for which the object vehicle prevalence degree is not sufficient, and it is possible to restrain the increase in processing load due to the provision of an unnecessary assist content to the object vehicle.

With each aspect of the present disclosure, it is possible to restrain the increase in processing load due to the provision of an unnecessary assist content to the object vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a diagram for describing a different-time multiple-vehicle estimation type content;

FIG. 5B is a diagram showing a situation after a certain time from a situation in FIG. 5A;

DETAILED DESCRIPTION OF EMBODIMENTS

An embodiment of the present disclosure will be described below with reference to the drawings.

Figure 1:
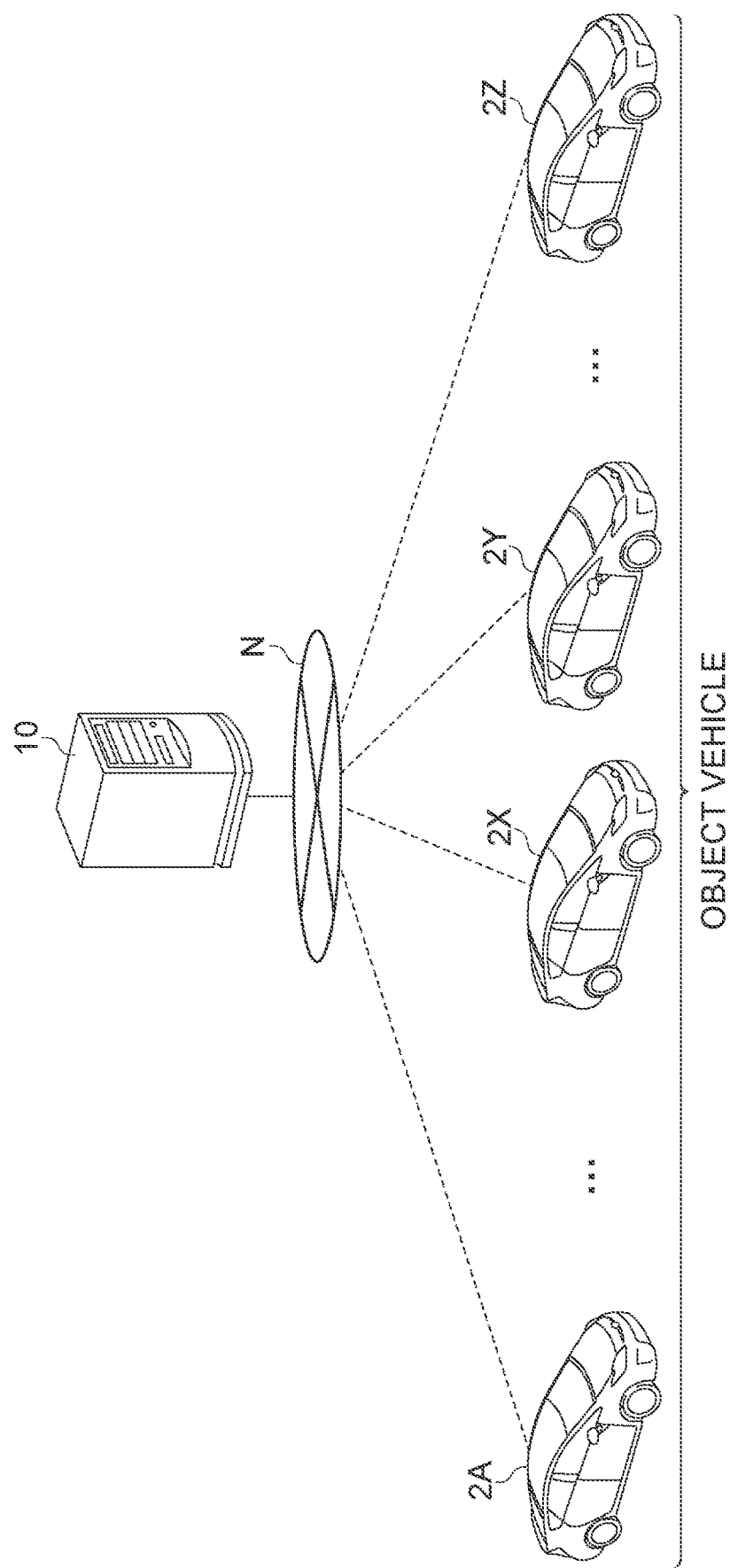
FIG. 1 is a diagram showing an exemplary vehicle assist system.

FIG. 1 is a diagram showing an exemplary vehicle assist system. As shown in FIG. 1, the vehicle assist system 1 is configured to include a vehicle assist server 10 and object vehicles 2. The vehicle assist server 10 is communicably connected with the object vehicles 2 (2A to 2Z) through a network N. The network N is a wireless communication network. The object vehicles 2 mean vehicles that are information collection objects of the vehicle assist server 10. The object vehicles 2 include assist object vehicles for which various assists are performed by the vehicle assist server 10. In the case where the object vehicles 2 are individually described, the object vehicles 2A to 2Z are used.

Figure 2:
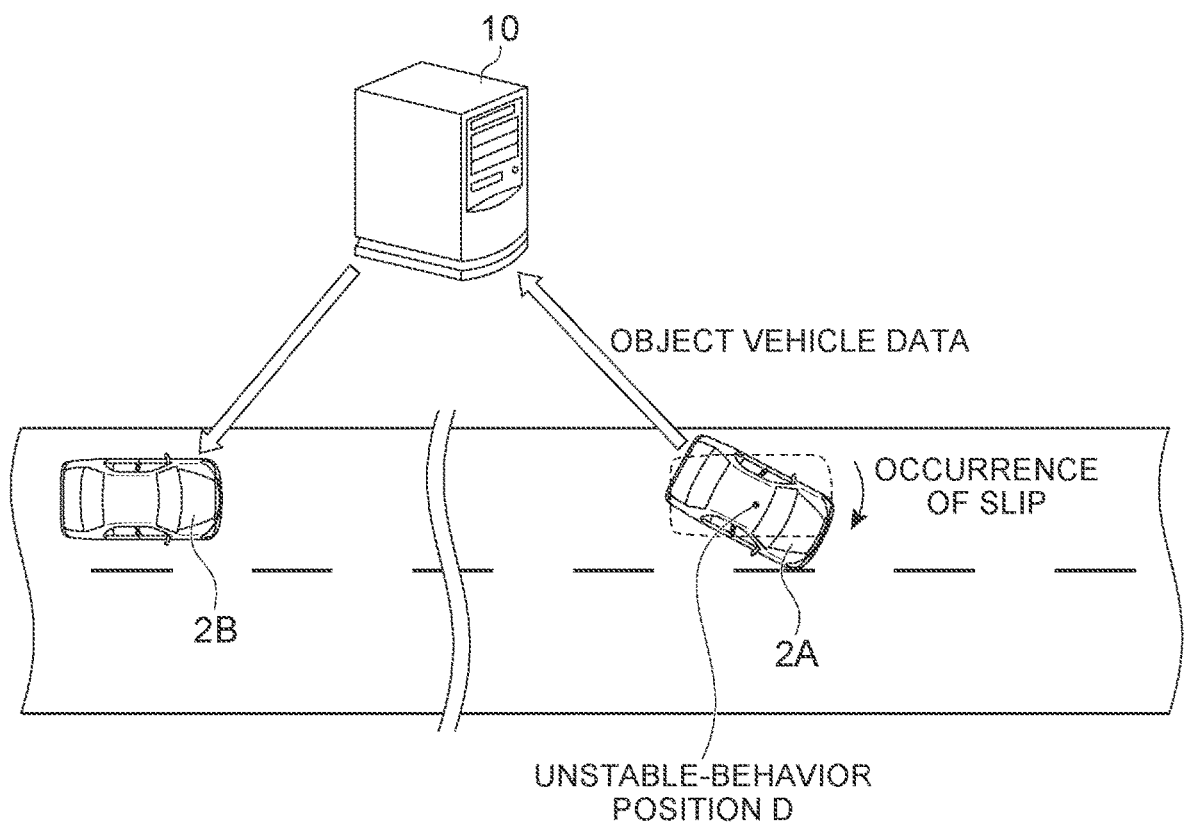
FIG. 2 is a diagram showing for describing an exemplary vehicle assist.

FIG. 2 is a diagram for describing an exemplary vehicle assist. As shown in FIG. 2, in the case where the slip of the object vehicle 2A has occurred due to road surface freezing or the like, the object vehicle 2A sends object vehicle data including an unstable-behavior position D that is a position where the slip of the object vehicle 2A has occurred, to the vehicle assist server 10. For example, the vehicle assist server 10 gives notice of information about the unstable-behavior position, to the object vehicle 2B that travels rearward of the object vehicle 2A. Thereby, the object vehicle 2B can restrain the occurrence of the slip of the object vehicle 2B at the unstable-behavior position D. The unstable-behavior position will be described later in detail.

Configuration of Object Vehicle

First, the configuration of the object vehicle 2 will be described. To the object vehicle 2, a vehicle identification number (ID) for identifying the vehicle is assigned. The number of the object vehicles 2 may be one, may be two or more, may be several tens or more, or may be several hundreds or more. The object vehicles 2 do not need to be vehicles that have an identical configuration, and may be different in vehicle type or the like. The object vehicles 2 may be autonomous driving vehicles that have an autonomous driving function, or may be vehicles that have no autonomous driving function.

Figure 3:
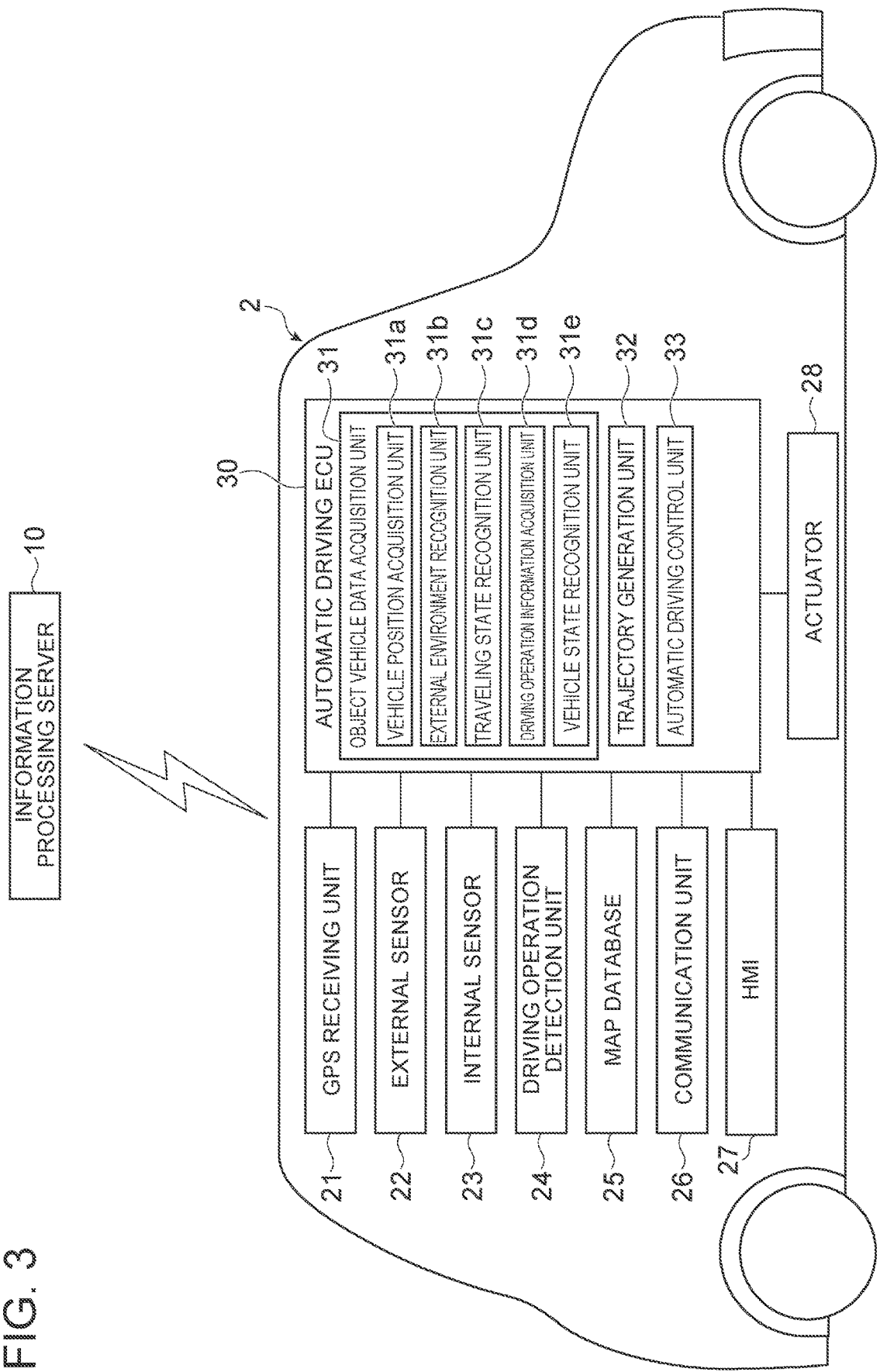
FIG. 3 is a block diagram showing an exemplary configuration of an object vehicle.

The object vehicle 2 will be described below with reference to FIG. 3. FIG. 3 is a block diagram showing an exemplary configuration of the object vehicle 2. In this embodiment, descriptions will be made assuming that the object vehicle 2 is an autonomous driving vehicle.

As shown in FIG. 3, the object vehicle 2 includes an autonomous driving ECU 30. The autonomous driving ECU 30 is an electronic control unit that includes a CPU, a ROM, a RAM and the like. The autonomous driving ECU 30 realizes various functions, for example, by loading programs stored in the ROM, on the RAM, and executing the programs loaded on the RAM, by the CPU. The autonomous driving ECU 30 may be constituted by a plurality of electronic units.

The autonomous driving ECU 30 is connected with a global positioning system (GPS) receiving unit 21, an external sensor 22, an internal sensor 23, a driving operation detection unit 24, a map database 25, a communication unit 26, a human machine interface (HMI) 27, and an actuator 28.

The GPS receiving unit 21 measures the position (for example, the latitude and longitude of the position of the object vehicle 2) of the object vehicle 2, by receiving signals from three or more GPS satellites. The GPS receiving unit 21 sends the measured position information about the object vehicle 2, to the autonomous driving ECU 30.

The external sensor 22 is a detection apparatus that detects the external environment of the object vehicle 2. The external sensor 22 includes at least one of a camera and a radar sensor.

The camera is an image pickup apparatus that picks up an image of the external environment of the object vehicle 2. The camera is provided on the back side of a windshield of the object vehicle 2, and picks up a vehicle forward view. The camera sends image pickup information relevant to the external environment of the object vehicle 2, to the autonomous driving ECU 30. The camera may be a monocular camera, or may be a stereo camera.

The radar sensor is a detection apparatus that detects a physical body in the vicinity of the object vehicle 2 using an electric wave (for example, a millimeter wave) or light. Examples of the radar sensor include a millimeter wave radar and a light detection and ranging (LIDAR). The radar sensor detects the physical body by sending the electric wave or light to the surroundings of the object vehicle 2 and receiving the electric wave or light reflected by the physical body. The radar sensor sends the detected physical body information to the autonomous driving ECU 30. The physical body includes a moving body such as a pedestrian, a bicycle and another vehicle, in addition to a fixed body such as a guardrail and a building. The external sensor 22 may include an ambient temperature sensor that detects the ambient temperature of the object vehicle 2. The external sensor 22 may include a light sensor that detects the brightness of the exterior.

The internal sensor 23 is a detection apparatus that detects the state of the object vehicle 2. The internal sensor 23 includes a vehicle speed sensor, an acceleration sensor and a yaw rate sensor, as sensors that detect the traveling state of the object vehicle 2. The vehicle speed sensor is a detector that detects the speed of the object vehicle 2. As the vehicle speed sensor, a vehicle wheel sensor that is provided for each wheel of the object vehicle 2, a drive shaft rotating integrally with the wheel, or the like, and that detects the rotation speed of the wheel can be used. The vehicle speed sensor sends the detected vehicle speed information (wheel speed information) to the autonomous driving ECU 30.

The acceleration sensor is a detector that detects the acceleration of the object vehicle 2. For example, the acceleration sensor includes a front-rear acceleration sensor that detects the acceleration of the object vehicle 2 in a front-rear direction of the object vehicle 2. The acceleration sensor may include a lateral acceleration sensor that detects the lateral acceleration of the object vehicle 2. For example, the acceleration sensor sends the acceleration information about the object vehicle 2 to the autonomous driving ECU 30. The yaw rate sensor is a detector that detects the yaw rate (turning angle speed) around the vertical axis of the gravity center of the object vehicle 2. As the yaw rate sensor, for example, a gyroscope sensor can be used. The yaw rate sensor sends the detected yaw rate information about the object vehicle 2, to the autonomous driving ECU 30.

The internal sensor 23 detects at least one of a tire pressure, a wiper actuation state and a lamp device state, as the vehicle state of the object vehicle 2. The tire pressure is the air pressure of the tire of the object vehicle 2. The wiper actuation state may include not only information indicating whether the wiper is actuated but also the actuation speed of the wiper. The lamp device state includes the lighting state of a direction indicator. The lamp device state may include information indicating whether a headlight is lighted and information indicating whether a fog lamp is lighted.

Further, as the vehicle state of the object vehicle 2, the internal sensor 23 may detect the brake pressure of a hydraulic brake system from a brake pressure sensor, and may detect an on-state or off-state of a traveling assist (for example, a vehicle stability control system described later). The internal sensor 23 may detect the load state of each wheel from a wheel load sensor, as the vehicle state of the object vehicle 2. In addition, the internal sensor 23 may include a breakdown detection unit that detects various breakdowns of the object vehicle 2.

The driving operation detection unit 24 detects an operation of an operation unit of the object vehicle 2 by a driver. For example, the driving operation detection unit 24 includes a steering sensor, an accelerator sensor and a brake sensor. The operation unit of the object vehicle 2 is an apparatus to which the driver inputs an operation for the driving of the vehicle. The operation unit of the object vehicle 2 includes at least one of a steering unit, an accelerator operation unit and a brake operation unit. For example, the steering unit is a steering wheel. The steering unit is not limited to a wheel shape, and only needs to be function as a handle. For example, the accelerator operation unit is an accelerator pedal. For example, the brake operation unit is a brake pedal. Each of the accelerator operation unit and the brake operation unit does not always need to be a pedal, and only needs to be a configuration allowing an input of acceleration or deceleration by the driver.

The steering sensor detects the operation amount of the steering unit by the driver. The operation amount of the steering unit includes steering angle. The operation amount of the steering unit may include steering torque. The accelerator sensor detects the operation amount of the accelerator operation unit by the driver. For example, the operation amount of the accelerator operation unit includes the stepping amount of the accelerator pedal. The brake sensor detects the operation amount of the brake operation unit by the driver. For example, the operation amount of the brake operation unit includes the stepping amount of the brake pedal. The brake sensor may be configured to detect the master cylinder pressure of the hydraulic brake system. Each of the operation amounts of the accelerator operation unit and the brake operation unit may include stepping speed. The driving operation detection unit 24 sends operation amount information relevant to the detected operation amount by the driver, to the autonomous driving ECU 30.

The map database 25 is a database that stores map information. For example, the map database 25 is stored in a storage device mounted on the object vehicle 2, as exemplified by a HDD. The map information includes position information about roads, information (for example, curvature information) about road forms, and position information about intersections and forks. The map information may include traffic regulation information associated with position information, as exemplified by information about legal speed. The map information may include physical object information that is used for the position recognition for the object vehicle 2 on the map. The physical object can include a mark line for a lane, a traffic light, a guardrail, a road surface mark and the like. The map database 25 may be configured in a server (the server is not limited to the vehicle assist server 10) that can communicate with the object vehicle 2.

The communication unit 26 is a communication device that controls wireless communication with the exterior of the object vehicle 2. The communication unit 26 sends and receives a variety of information through the network N. The communication unit 26 sends a variety of information to the vehicle assist server 10, in response to signals from the autonomous driving ECU 30.

The HMI 27 is an interface for the input and output of information between the autonomous driving ECU 30 and the driver or an occupant. For example, the HMI 27 includes a display, a speaker and the like that are provided in a vehicle cabin. The HMI 27 performs the image output from the display and the voice output from the speaker, in response to a control signal from the autonomous driving ECU 30.

The actuator 28 is an apparatus that is used for the control of the object vehicle 2. The actuator 28 includes at least a drive actuator, a brake actuator and a steering actuator. The drive actuator controls the supply amount (throttle opening degree) of air to an engine in response to a control signal from the autonomous driving ECU 30, and controls the drive power of the object vehicle 2. In the case where the object vehicle 2 is a hybrid electric vehicle, in addition to the supply amount of air to the engine, a control signal from the autonomous driving ECU 30 is input to a motor that is a dynamic power source, and the drive power is controlled. In the case where the object vehicle 2 is a battery electric vehicle, a control signal from the autonomous driving ECU 30 is input to a motor that is a dynamic power source, and the drive power is controlled. In these cases, each of the motors that are dynamic power sources constitutes the actuator 28.

The brake actuator controls a brake system in response to a control signal from the autonomous driving ECU 30, and controls braking power that is given to the wheel of the object vehicle 2. As the brake system, for example, a hydraulic brake system can be used. The steering actuator controls the drive of an assist motor that is of an electric power steering system and that controls the steering torque, in response to a control signal from the autonomous driving ECU 30. Thereby, the steering actuator controls the steering torque of the object vehicle 2.

Next, a functional configuration of the autonomous driving ECU 30 will be described. As shown in FIG. 3, the autonomous driving ECU 30 includes an object vehicle data acquisition unit 31, a trajectory generation unit 32 and an autonomous driving control unit 33. Some of the following functions of the autonomous driving ECU 30 may be executed in a server (the server is not limited to the vehicle assist server 10) that can communicate with the object vehicle 2.

The object vehicle data acquisition unit 31 obtains object vehicle data that is data relevant to the object vehicle 2. The object vehicle data includes the position information about the object vehicle 2 on the map and the traveling state of the object vehicle 2. The object vehicle data may include the external environment of the object vehicle 2, and may include a route along which the object vehicle 2 travels. The object vehicle data may include information about the driving operation of the object vehicle 2 by the driver and the vehicle state of the object vehicle 2. The object vehicle data acquisition unit 31 sends the acquired object vehicle data to the vehicle assist server 10.

The object vehicle data acquisition unit 31 includes a vehicle position acquisition unit 31a, an external environment recognition unit 31b, a traveling state recognition unit 31c, a driving operation information acquisition unit 31d and a vehicle state recognition unit 31e.

The vehicle position acquisition unit 31a acquires the position information about the object vehicle 2 on the map, based on the position information of the GPS receiving unit 21 and the map information of the map database 25. The vehicle position acquisition unit 31a may acquire the position information about the object vehicle 2 by a simultaneous localization and mapping (SLAM) technology, using the physical information included in the map information of the map database 25 and the detection result of the external sensor 22. The vehicle position acquisition unit 31a may recognize a lateral position (the position of the object vehicle 2 in a lane width direction) of the object vehicle 2 relative to the lane, from the position relation between the mark line for the lane and the object vehicle 2, and may add the lateral position to the position information. The vehicle position acquisition unit 31a may acquire the position information about the object vehicle 2 on the map, by another well-known technique.

The external environment recognition unit 31b recognizes the external environment of the object vehicle 2, based on the detection result of the external sensor 22. The external environment includes the position of the peripheral physical body relative to the object vehicle 2. The external environment may include the speed of the peripheral physical body relative to the object vehicle 2 and the movement direction. The external environment may include the kind of the physical body such as another vehicle, a pedestrian and a bicycle. The kind of the physical body can be identified by a well-known technique such as a pattern matching. The external environment may include the result of mark line recognition (white line recognition) in the vicinity of the object vehicle 2. The external environment may include the ambient temperature, and may include the weather.

The traveling state recognition unit 31c recognizes the traveling state of the object vehicle 2, based on the detection result of the internal sensor 23. The traveling state includes the vehicle speed of the object vehicle 2 and the yaw rate of the object vehicle 2. The traveling state may include the acceleration of the object vehicle 2. Specifically, the traveling state recognition unit 31*c* recognizes the vehicle speed of the object vehicle 2, based on the vehicle information of the vehicle speed sensor. The traveling state recognition unit 31*c* recognizes the acceleration of the object vehicle 2, based on the acceleration information of the acceleration sensor. The traveling state recognition unit 31*c* recognizes the orientation of the object vehicle 2, based on the yaw rate information of the yaw rate sensor.

The driving operation information acquisition unit 31*d* acquires driving operation information about the object vehicle 2, based on the detection result of the driving operation detection unit 24. For example, the driving operation information includes at least one of the accelerator operation amount, brake operation amount and steering amount of the driver.

In the case where the object vehicle 2 has a personal authentication function, the driving operation information acquisition unit 31*d* stores a driving operation history for each of personally authenticated drivers. The driving operation history may be associated with the external environment and traveling state of the object vehicle 2. The autonomous driving ECU 30 does not always need to include the driving operation information acquisition unit 31*d*. In this case, the driving operation detection unit 24 is also unnecessary.

The vehicle state recognition unit 31*e* recognizes the vehicle state of the object vehicle 2, based on the detection result of the internal sensor 23. The vehicle state may include the tire pressure. The vehicle state may include the wiper actuation state and the lamp device state, and may include the breakdown state of the object vehicle 2. The autonomous driving ECU 30 does not always need to include the vehicle state recognition unit 31*e*.

The trajectory generation unit 32 generates a trajectory that is used in the autonomous driving of the object vehicle 2. The trajectory generation unit 32 generates the trajectory in the autonomous driving, based on a previously set traveling route, the map information, the position of the object vehicle 2 on the map, the external environment of the object vehicle 2 and the traveling state of the object vehicle 2.

The traveling route is a route along which the object vehicle 2 travels in the autonomous driving. For example, the trajectory generation unit 32 evaluates the traveling route in the autonomous driving, based on a destination, the map information and the position of the object vehicle 2 on the map. The traveling route may be set by a well-known navigation system. The destination may be set by the occupant of the object vehicle 2, or may be automatically proposed by the autonomous driving ECU 30, the navigation system or the like.

The trajectory includes a path along which the vehicle travels in the autonomous driving, and a vehicle speed profile in the autonomous driving. The path is a locus along which the vehicle during the autonomous driving is planned to travel on the traveling route. For example, the path may be data (steering angle profile) about change in the steering angle of the object vehicle 2 depending on the position on the traveling route. The position on the traveling route is a set longitudinal position that is set at a predetermined interval (for example, 1 m) in the moving direction on the traveling route. The steering angle profile is data that is associated with a target steering angle for each set longitudinal position.

For example, the trajectory generation unit 32 generates the path along which the vehicle travels, based on the traveling route, the map information, the external environment of the object vehicle 2 and the traveling state of the object vehicle 2. For example, the trajectory generation unit 32 generates the path such that the object vehicle 2 passes through the center (the center in the lane width direction) of the lane included in the traveling route.

A steering torque profile associated with a target steering torque for each set longitudinal position may be used instead of the steering angle profile. A lateral position profile associated with a target lateral position for each set longitudinal position may be used instead of the steering angle profile. The target lateral position is a target position on the lane in the width direction of the lane. In this case, the set longitudinal position and the target lateral position may be collectively set as a pair of position coordinates.

For example, the vehicle speed profile is data that is associated with a target vehicle speed for each set longitudinal position. The set longitudinal position may be set on the basis of the traveling time of the vehicle, instead of distance. The set longitudinal position may be set as an arrival position of the vehicle after one second or an arrival position of the vehicle after two seconds.

For example, the trajectory generation unit 32 generates the vehicle speed profile based on the path and speed relevant information such as the legal speed included in the map information. A set speed that is previously set for a position or section on the map may be used instead of the legal speed. The trajectory generation unit 32 generates the trajectory in the autonomous driving, from the path and the vehicle speed profile. The generation method for the trajectory in the trajectory generation unit 32 is not limited to the above-described content, and another well-known method may be employed.

In the case where the trajectory generation unit 32 receives a notice of traveling path change for avoiding the unstable-behavior position from the vehicle assist server 10, the trajectory generation unit 32 changes the path for the object vehicle 2 such that the object vehicle 2 does not pass through the unstable-behavior position. The trajectory generation unit 32 may change the traveling route (the road along which the object vehicle 2 travels) along which the object vehicle 2 travels, or may change the path for the object vehicle 2 such that the object vehicle 2 is away from the unstable-behavior position by a certain distance or longer in a road width direction on the same road.

In the case where the trajectory generation unit 32 receives a notice of unstable-behavior position information and stable-traveling data from the vehicle assist server 10, the trajectory generation unit 32 generates the trajectory based on the unstable-behavior position information and the stable-traveling data, such that the unstable behavior of the object vehicle 2 does not occur. The unstable-behavior position information and the stable-traveling data will be described later in detail. The trajectory generation unit 32 generates the trajectory such that the traveling state of the object vehicle 2 comes close to the traveling state in the stable-traveling data near the unstable-behavior position. In the case where the trajectory generation unit 32 receives a stable-traveling instruction from the vehicle assist server 10 instead of the notice of the stable-traveling data, the trajectory generation unit 32 generates the trajectory in accordance with the stable-traveling instruction. The stable-traveling instruction will be described later in detail.

The autonomous driving control unit 33 executes the autonomous driving of the object vehicle 2. For example, the autonomous driving control unit 33 executes the autonomous driving of the object vehicle 2, based on the external environment of the object vehicle 2, the traveling state of the object vehicle 2 and the trajectory generated by the trajectory generation unit 32. The autonomous driving control unit 33 performs the autonomous driving of the object vehicle 2 by sending the control signal to the actuator 28.

In the case where the autonomous driving control unit 33 receives an instruction of autonomous driving cancellation from the vehicle assist server 10, the autonomous driving control unit 33 performs the autonomous driving cancellation at the unstable-behavior position. The autonomous driving control unit 33 gives a notice of transition to manual driving to the driver through the HMI 27. After the notification to the driver, the autonomous driving control unit 33 cancels the autonomous driving, and performs the transition to the manual driving by the driver. Further, the autonomous driving control unit 33 gives a notice of the unstable-behavior position information received from the vehicle assist server 10, to the driver through the HMI 27.

The object vehicle 2 does not always need to be an autonomous driving vehicle. In this case, the ECU of the object vehicle 2 does not need to include the trajectory generation unit 32 and the autonomous driving control unit 33. The ECU of the object vehicle 2 only needs to include an information providing unit that can give notices of the unstable-behavior position information or the like to the driver through the HMI 27. The ECU of the object vehicle 2 may include a driving assist unit that performs the driving assist such that the traveling state of the object vehicle 2 comes close to the traveling state in the stable-traveling data near the unstable-behavior position in the case of receiving a notice of the stable-traveling data from the vehicle assist server 10. The method for the driving assist is not particularly limited, and the information provision to the driver may be performed, or the traveling control for the vehicle may be performed.

Configuration of Vehicle Assist Server

Figure 4:
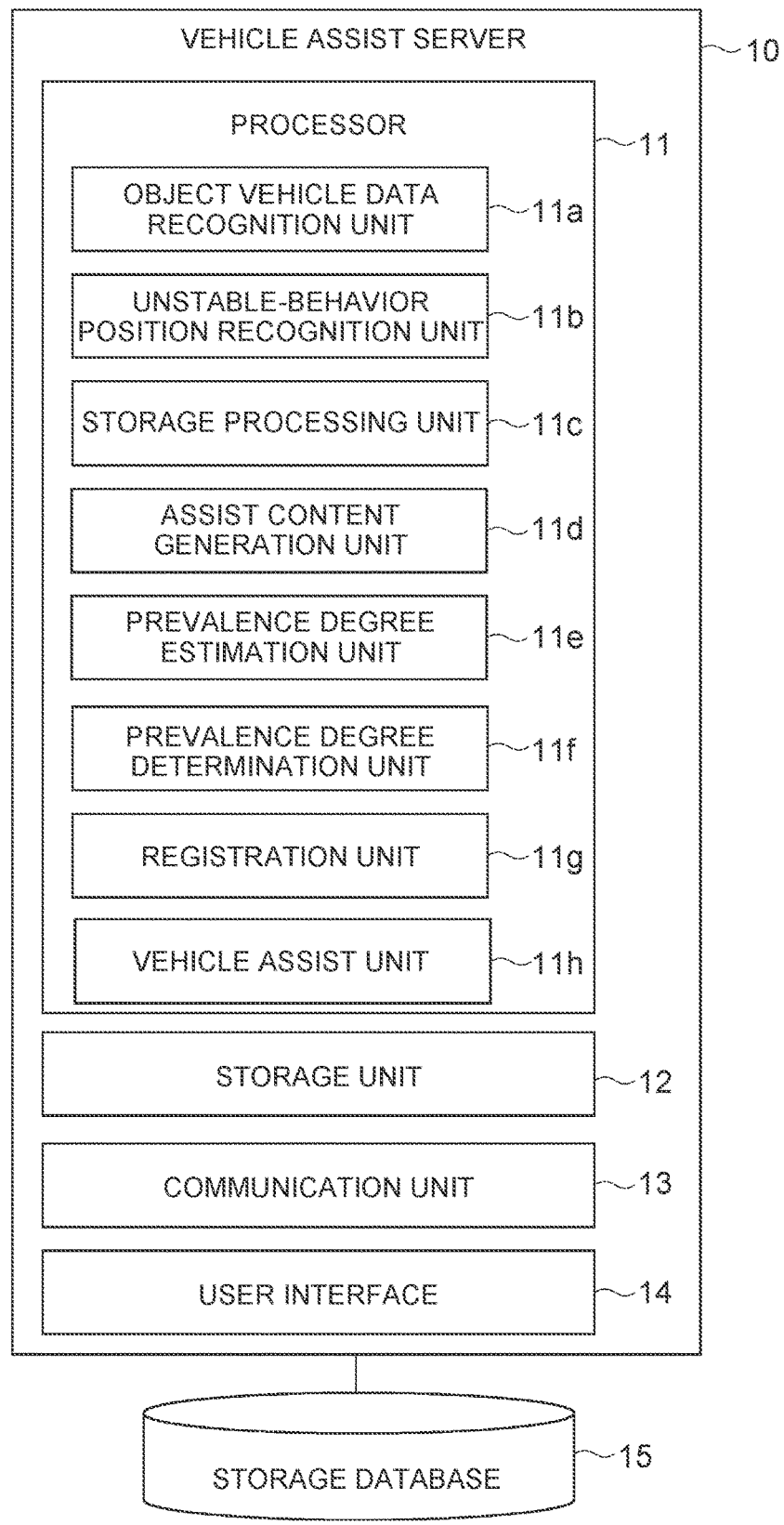
FIG. 4 is a block diagram showing an exemplary configuration of a vehicle assist server.

For example, the vehicle assist server 10 is provided in a facility such as an information management center, and is configured to be capable of communicating with the object vehicle 2. FIG. 4 is a block diagram showing an exemplary configuration of the vehicle assist server 10. The vehicle assist server 10 shown in FIG. 4 is configured as a general computer that includes a processor 11, a storage unit 12, a communication unit 13 and a user interface 14.

For example, the processor 11 controls the vehicle assist server 10 by operating an operating system. The processor 11 is an arithmetic unit such as a central processing unit (CPU) that includes a control device, an arithmetic device, a register and the like. The processor 11 supervises the storage unit 12, the communication unit 13 and the user interface 14. The storage unit 12 is configured to include at least one of a memory and a storage. The memory is a recording medium such as a read only memory (ROM) and a random access memory (RAM). The storage is a recording medium such as hard disk drive (HDD).

The communication unit 13 is a communication apparatus for performing communication through the network N. As the communication unit 13, a network device, a network controller, a network card and the like can be used. The user interface 14 is an apparatus that includes an output device such as a display and a speaker and an input device such as a touch panel. The vehicle assist server 10 does not always need to be provided in a facility, and may be mounted on a movable body such as a vehicle and a ship.

The vehicle assist server 10 is connected with a storage database 15. The storage database 15 is a database for storing the unstable-behavior position information and the like. The storage database 15 may have the same configuration as a well-known HDD database. Further, in the storage database 15, information indicating whether an assist content described later is provided is recorded for each setting area. The storage database 15 may be provided in a facility or the like that is away from the vehicle assist server 10.

Next, a functional configuration of the processor 11 will be described. As shown in FIG. 4, the processor 11 includes an object vehicle data recognition unit 11a, an unstable-behavior position recognition unit 11b, a storage processing unit 11c, an assist content generation unit 11d, a prevalence degree estimation unit 11e, a prevalence degree determination unit 11f, a registration unit 11g and a vehicle assist unit 11h.

The object vehicle data recognition unit 11a recognizes (acquires) the object vehicle data sent from the object vehicle 2. The object vehicle data includes the position information about the object vehicle 2 on the map and the traveling state of the object vehicle 2. The object vehicle data may include the external environment of the object vehicle 2, and may include the route along which the object vehicle 2 travels. The object vehicle data recognition unit 11a may acquire the object vehicle data in association with the setting area described later.

The unstable-behavior position recognition unit 11b recognizes an unstable-behavior position that is a position on the map where the unstable behavior of the object vehicle 2 has occurred, based on the object vehicle data acquired by the object vehicle data recognition unit 11a. The unstable behavior is a behavior of the vehicle that causes the traveling of the vehicle to be unstable. For example, the unstable behavior includes a slip. The unstable behavior may include a rapid deceleration or a rapid steering angle change. The unstable behavior may include a lane departure of the object vehicle 2, and may include an excessive approach of the object vehicle 2 to the physical body.

First, the determination of the unstable behavior will be described. The unstable-behavior position recognition unit 11b determines whether the unstable behavior of the object vehicle 2 has occurred, based on the object vehicle data. For example, the unstable-behavior position recognition unit 11b determines that the object vehicle 2 has slipped as the unstable behavior, based on at least one of the acceleration (front-rear acceleration and lateral acceleration) that is detected by the acceleration sensor, the wheel speed of each wheel that is detected by the wheel speed sensor, the yaw rate that is detected by the yaw rate sensor, the steering angle by the driver that is detected by the steering sensor, the brake operation amount by the driver that is detected by the brake sensor, and the brake pressure of the brake pressure sensor. The master cylinder pressure of the hydraulic brake system may be used instead of the brake operation amount of the brake sensor.

For the determination of the slip, the unstable-behavior position recognition unit 11b may use an actuation start condition for a well-known antilock brake system (ABS). For example, the antilock brake system is actuated in the case where the wheel that is likely to be locked is identified by the comparison between the wheel speed of each wheel and an estimated vehicle body speed. The estimated vehicle body speed may be evaluated from the wheel speed of each wheel until the slip, or may be evaluated from the change in acceleration until the slip.

Further, for the determination of the slip, the unstable-behavior position recognition unit 11b may use an actuation start condition for a well-known vehicle stability control (VSC) system, or may use an actuation start condition for a well-known traction control system (TRC). The traction control can be actuated in the case where a wheel that is running idle is identified by the comparison between the wheel speed of each wheel and the estimated vehicle body speed. The unstable-behavior position recognition unit 11b may determine the slip of the object vehicle 2 by another well-known technique.

The unstable-behavior position recognition unit 11b may determine whether the rapid deceleration of the object vehicle 2 has occurred as the unstable behavior, based on the deceleration detected by the acceleration sensor. In this case, for example, when the absolute value of the deceleration is equal to or larger than a rapid deceleration threshold, the unstable-behavior position recognition unit 11b determines that the rapid deceleration of the object vehicle 2 has occurred. The rapid deceleration threshold is a threshold that is a previously set value. Hereinafter, thresholds to be used in the description means thresholds that are previously set values.

The unstable-behavior position recognition unit 11b may determine whether the rapid steering angle change of the object vehicle 2 has occurred as the unstable behavior, based on the yaw rate detected by the yaw rate sensor. In this case, for example, when the yaw rate is equal to or higher than a steering angle change threshold, the unstable-behavior position recognition unit 11b determines that the rapid steering angle change of the object vehicle 2 has occurred. A tire turn angle may be used instead of the yaw rate.

In the case where the direction indicator is not lighted, the unstable-behavior position recognition unit 11b may determine whether the lane departure of the object vehicle 2 has occurred as the unstable behavior, based on the lateral position of the object vehicle 2 or the external environment of the object vehicle 2. In this case, for example, the unstable-behavior position recognition unit 11b determines the lane departure from the lateral position of the object vehicle 2. Alternatively, the unstable-behavior position recognition unit 11b may determine the lane departure in the case where the unstable-behavior position recognition unit 11b recognizes that the object vehicle 2 has crossed the mark line for the lane, from the external environment of the object vehicle 2.

The unstable-behavior position recognition unit 11b may determine whether the excessive approach of the object vehicle 2 to the physical body has occurred as the unstable behavior, based on the traveling state of the object vehicle 2 and the external environment of the object vehicle 2. In this case, when the object vehicle 2 travels at a low speed, a behavior by which the interval to the physical body becomes small is not an unstable behavior. Therefore, the unstable-behavior position recognition unit 11b determines that the excessive approach of the object vehicle 2 to the physical body has occurred in the case where the vehicle speed of the object vehicle 2 is equal to or higher than a vehicle speed threshold and where a time-to-collision (TTC) between the object vehicle 2 and the physical body is equal to or shorter than a TTC threshold. Instead of the time-to-collision, a time-headway (THW) or distance may be used.

The determination of whether the unstable behavior of the object vehicle 2 has occurred may be performed whenever the object vehicle data is obtained, or may be collectively performed every certain time or every certain period. The determination of whether the unstable behavior of the object vehicle 2 has occurred may be performed when the object vehicle 2 is in a stop state.

Next, the recognition of the unstable-behavior position will be described. The unstable-behavior position is the position of the object vehicle 2 on the map when the unstable behavior of the object vehicle 2 has occurred. In the case where the unstable-behavior position recognition unit 11b determines that the unstable-behavior of the object vehicle 2 has occurred, the unstable-behavior position recognition unit 11b recognizes the unstable-behavior position.

The unstable-behavior position recognition unit 11b recognizes the unstable-behavior position, based on the position information about the object vehicle 2 on the map when the unstable-behavior position recognition unit 11b determines that the unstable behavior of the object vehicle 2 has occurred. The unstable-behavior position is distinctively recognized for each lane. In the case where the unstable behavior is the lane departure, the unstable-behavior position may be a position on the traveling lane before the lane departure, or may be a position on the mark line.

The unstable-behavior position may be recognized not as a position on the map but as a section or area. In the case where the object vehicle 2 slides while slipping, the unstable-behavior position recognition unit 11b may adopt the start position of the slip as the unstable-behavior position, or may adopt the whole of a section in which the object vehicle 2 moves in the state of the determination of the slip, as the unstable-behavior position. The area may be a range within a certain distance from the slipped object vehicle 2, or may be a district or division where the object vehicle 2 travels. The same goes for other unstable behaviors.

The storage processing unit 11c stores the unstable-behavior position information relevant to the unstable-behavior position recognized by the unstable-behavior position recognition unit 11b, in the storage database 15. The storage processing unit 11c stores the unstable-behavior position information in the storage database 15, in association with the object vehicle data about the object vehicle 2 that travels at the unstable-behavior position. The storage processing unit 11c does not always need to store the object vehicle data about all object vehicles 2 that travels at the unstable-behavior position.

The assist content generation unit 11d generates the assist content based on the object vehicle data. The assist content is a content relevant to the vehicle assist by the vehicle assist server 10. For example, the assist content is generated in association with the position on the map. The assist content may be generated in association with the vehicle or the driver. The assist content includes a single-vehicle estimation type content and a multiple-vehicle estimation type content.

The single-vehicle estimation type content is a content that is generated from only the object vehicle data about one object vehicle at the time of the occurrence of an event of the object vehicle 2. The event includes the above-described unstable behavior.

Specifically, the single-vehicle estimation type content includes at least one of the slip, the rapid approach to the physical body, the lane departure and the recognition of a bump or dip on a road surface. The physical body includes a structure such as another vehicle (including a two-wheel vehicle and a bicycle), a pedestrian and a guardrail. The lane departure may be recognized based on whether a lane departure alarm is executed. The recognition of the bump or dip on the road surface may be performed in the case where a bump or dip having a certain height or more is recognized even when the unstable behavior does not occur actually. The recognition of the bump or dip on the road surface is not included in the unstable behavior. In the case where a rapid change in vehicle attitude occurs due to the recognition of the bump or dip on the road surface, the rapid change in vehicle attitude can be an unstable behavior.

For example, as shown in FIG. 2, in association with the position (the unstable-behavior position D in this case) where the slip of the object vehicle 2 has occurred, the assist content generation unit 11d generates the single-vehicle estimation type content for the slip, based on the object vehicle data stored in the storage database 15.

The multiple-vehicle estimation type content is a content that is generated from the object vehicle data about a plurality of object vehicles that has performed an event. The multiple-vehicle estimation type content includes a different-time multiple-vehicle estimation type content and an identical-time multiple-vehicle estimation type content. The different-time multiple-vehicle estimation type content is a content that is generated based on the object vehicle data about a plurality of object vehicles when the plurality of object vehicles 2 has performed the event at an identical position at different times. The different-time multiple-vehicle estimation type content is generated also when an identical object vehicle 2 has performed the event at an identical position multiple times. Specifically, the different-time multiple-vehicle estimation type content includes at least one of a frequent speed decrease (for example, a repeat of the stop state at a speed of 0 km/h), a speed exceedance, a rapid acceleration or deceleration and a frequent lane change.

The speed exceedance is a state where the object vehicle 2 travels at a speed exceeding a previously set reference speed (for example, the legal speed), or a state where the object vehicle 2 travels at a speed detected as an abnormal value in the data about the object vehicle 2. As a method for detecting the abnormal value from the data (big data) about the object vehicle 2, a well-known technique can be employed. The rapid acceleration or deceleration is a state where a certain acceleration or deceleration or higher is generated. The frequent lane change is recognized in the case where the lane change is repeated at an identical position multiple times or in the case where a rapid lane change with a certain steering angle change or larger is performed. The frequent lane change includes also a frequent lane change to a passing lane.

FIG. 5A is a diagram for describing the different-time multiple-vehicle estimation type content. FIG. 5A shows an object vehicle 2A that has performed the unstable behavior (for example, the rapid deceleration) at the unstable-behavior position D, and an object vehicle 2B that travels on the identical lane rearward of the object vehicle 2A. FIG. 5B is a diagram showing a situation after a certain time from the situation in FIG. 5A.

For example, in the case where the unstable behavior is recognized multiple times at the identical unstable-behavior position D at different times as shown in FIG. 5A and FIG. 5B, the assist content generation unit 11d generates the different-time multiple-vehicle estimation type content for the unstable behavior (for example, the rapid deceleration) in association with the unstable behavior position D, based on the object vehicle data about the object vehicle 2A and the object vehicle 2B. The number (the number of occurrences of the event at an identical position) of pieces of object vehicle data necessary for the generation of the different-time multiple-vehicle estimation type content is previously set.

The identical-time multiple-vehicle estimation type content is a content that is generated based on the object vehicle data about a plurality of object vehicles 2 when the plurality of object vehicles 2 has performed the event at an identical position at an identical time. For the generation of the identical-time multiple-vehicle estimation type content, a plurality of different object vehicles 2 needs to exist at an identical position at an identical time.

Specifically, the identical-time multiple-vehicle estimation type content includes at least one of a vehicle approach at the time of merging, a congestion tail end, a cut-in of a vehicle, and a run-out of a vehicle at a T-junction. The vehicle approach at the time of merging is a state where at least two object vehicles 2 have excessively approached each other at the time of merging at a merging spot where a plurality of roads merges. For the vehicle approach at the time of merging, it may be determined more easily that the object vehicles 2 have approached each other, compared to the rapid approach to the physical body in the single-vehicle estimation type content.

The congestion tail end is a content that is generated in association with the position of the tail end of the congestion when the object vehicle 2 encounters the congestion as the event. For the determination of the congestion, the object vehicle data about a plurality of object vehicles 2 existing in the congestion at an identical time is used. The position of the tail end of the congestion may be acquired from an object vehicle 2 that is actually positioned at the tail end. The cut-in of the vehicle is a situation where an object vehicle 2 has cut in front of another object vehicle 2. The run-out of the vehicle at the T-junction is a situation where an object vehicle 2 has run out in front of another object vehicle 2.

Figure 6:
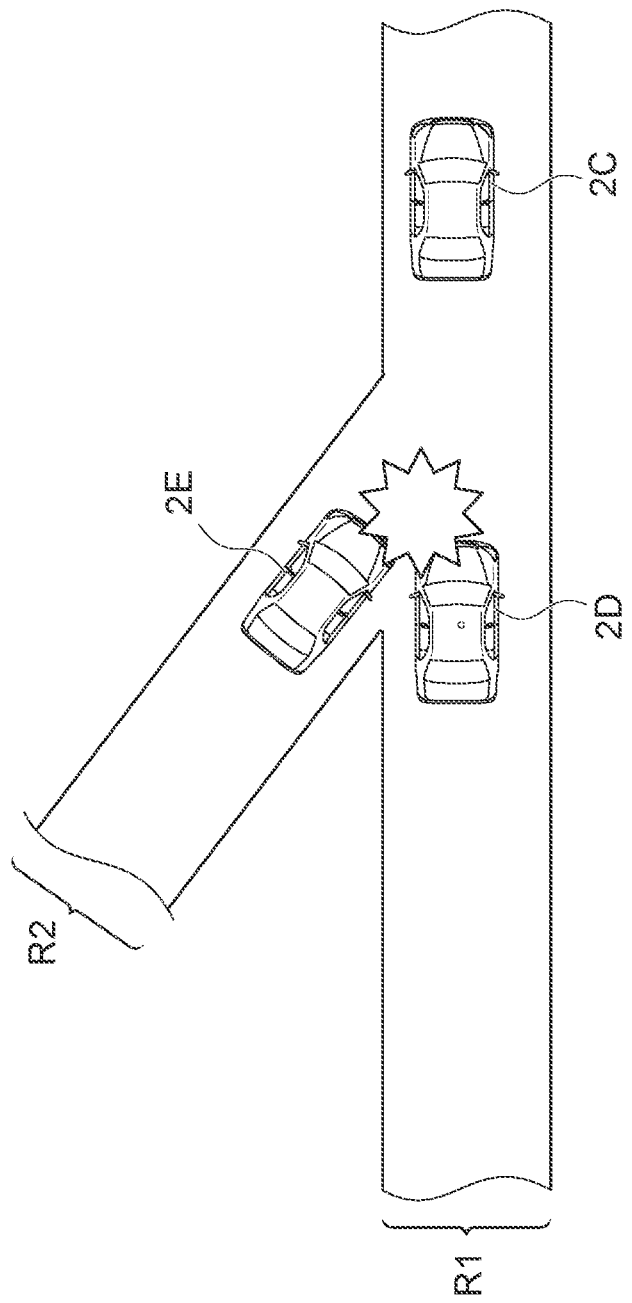
FIG. 6 is a diagram for describing an identical-time multiple-vehicle estimation type content.

FIG. 6 is a diagram for describing the identical-time multiple-vehicle estimation type content. FIG. 6 shows a first lane R1, a second lane R2 that merges with the first lane R1, an object vehicle 2C and an object vehicle 2D that travel on the first lane R1, and an object vehicle 2E that travels on the second lane R2. The object vehicle 2C is a vehicle ahead of the object vehicle 2D. The object vehicle 2D and the object vehicle 2E have performed the event of the vehicle approach at the time of merging at the merging spot between the first lane R1 and the second lane R2. The unstable-behavior position D corresponds to the merging spot between the first lane R1 and the second lane R2.

For example, in the situation shown in FIG. 6, the assist content generation unit 11d generates the identical-time multiple-vehicle estimation type content for the vehicle approach at the time of merging, in association with the unstable-behavior position D, based on the object vehicle data about the object vehicles 2C to 2E. The object vehicle data about the object vehicle 2C is not essential. The number of pieces of object vehicle data necessary for the generation of the identical-time multiple-vehicle estimation type content is previously decided for each assist content.

Based on the object vehicle data (including the position information about the object vehicle 2 on the map) about a setting area that is previously set on the map, the prevalence degree estimation unit 11e estimates an object vehicle prevalence degree for each setting area. The object vehicle prevalence degree is the degree of prevalence of the object vehicle 2 in the setting area. The object vehicle data that is used for the estimation of the object vehicle prevalence degree may include data from the object vehicle 2 about which information can be sent to the vehicle assist server 10 but information cannot be received.

The setting area is an area where the assist content is provided. A plurality of setting areas is set on the map. The setting areas do not need to overlap. Whether the assist content is provided is determined for each setting area. The method for deciding the setting area is not particularly limited. The setting areas may be set so as to correspond to districts, or may be set so as to correspond to local government regions such as prefectures, cities, towns or villages.

The setting areas may be set as certain sections on roads, or may be set as areas containing intersections. The largeness of the setting area can be arbitrarily set.

For example, in the case where the average of passing time differences of object vehicles 2 in the setting area is equal to or longer than a passing time difference threshold, the prevalence degree estimation unit 11e estimates that the object vehicle prevalence degree for the setting area is a lower value than in the case where the average of passing time differences of object vehicles 2 is shorter than the passing time difference threshold. Instead of the average of passing time differences, the median or another value may be used.

The prevalence degree estimation unit 11e may acquire a vehicle traffic quantity in the setting area as traffic information from the exterior such as a server in a government office or an automobile manufacturer, and may estimate the object vehicle prevalence degree for the setting area by evaluating the ratio of the number of the object vehicles 2 to the vehicle traffic quantity in the setting area. The number of the object vehicles 2 in the setting area can be calculated from the position information about the object vehicles 2 on the map in the object vehicle data. The number of passing object vehicles 2 in the setting area during a certain period (for example, one day) may be used as the number of the object vehicles 2. The certain period can be set to an arbitrary period. The prevalence degree estimation unit 11e may estimate the object vehicle prevalence degree, using the number of object vehicles 2 sold by the automobile manufacturer.

Based on the object vehicle prevalence degree for each setting area that is estimated by the prevalence degree estimation unit 11e and a necessary prevalence degree that is previously set for each of a plurality of kinds of assist contents, the prevalence degree determination unit 11f determines whether the object vehicle prevalence degree for the corresponding setting area is equal to or higher than the necessary prevalence degree, for each assist content. In other words, the prevalence degree determination unit 11f determines whether there is an assist content for which the object vehicle prevalence degree for the setting area is equal to or higher than the necessary prevalence degree.

The necessary prevalence degree is set for each assist content. The necessary prevalence degree for the multiple-vehicle estimation type content may be higher than the necessary prevalence degree for the single-vehicle estimation type content. The necessary prevalence degree for the identical-time multiple-vehicle estimation type content may be higher than the necessary prevalence degree for the different-time multiple-vehicle estimation type content.

The necessary prevalence degree for the lane departure in the single-vehicle estimation type content is higher than the necessary prevalence degree for the slip. The necessary prevalence degree for the speed exceedance in the different-time multiple-vehicle estimation type content may be higher than the necessary prevalence degree for the rapid acceleration or deceleration. The necessary prevalence degree for the congestion tail end that is an identical-time multiple-vehicle estimation type content may be higher than the necessary prevalence degree for the vehicle approach at the time of merging. The necessary prevalence degree may be previously registered in a management list.

The registration unit 11g registers the assist content for which the prevalence degree determination unit 11f determines that the object vehicle prevalence degree is equal to or higher than the necessary prevalent degree, in the storage database 15, as the assist content that is a provision object in the corresponding setting area. The registration unit 11g may register the assist content as the provision object, in association with the time of the determination by the prevalence degree determination unit 11f, for each setting area.

In the case where it is determined that there is an object vehicle 2 that needs to be assisted, the vehicle assist unit 11h performs a vehicle assist corresponding to the assist content registered as the provision object in the setting area. For example, based on the object vehicle data, the vehicle assist unit 11h recognizes an object vehicle 2 that arrives within a certain time at a position (for example, the unstable-behavior position) on the map that corresponds to the assist content as the provision object, as the object vehicle 2 that needs to be assisted. The vehicle assist unit 11h executes the vehicle assist corresponding to the assist content as the provision object, for the object vehicle 2 that needs to be assisted. The vehicle assist unit 11h executes the vehicle assist such as the notification of information relevant to the assist content and the provision of suggestion for change in the route (road) or change in the traveling path on the road.

Program

A program causes the processor 11 of the vehicle assist server 10 to function (operate) as the object vehicle data recognition unit 11a, the unstable-behavior position recognition unit 11b, the storage processing unit 11c, the assist content generation unit 11d, the prevalence degree estimation unit 11e, the prevalence degree determination unit 11f, the registration unit 11g and the vehicle assist unit 11h. For example, the program is provided by a non-transitory recording medium (storage medium) such as a ROM or a semiconductor memory. Further, the program may be provided through a network communication, for example.

Processing Method for Vehicle Assist Server

Figure 7:
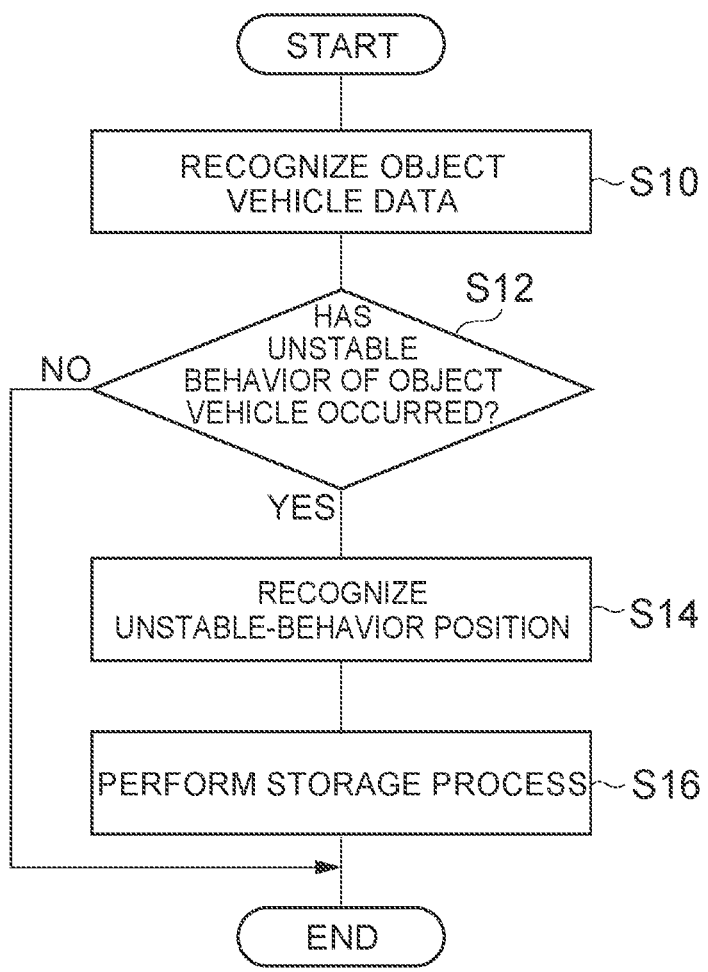
FIG. 7 is a flowchart showing an exemplary process for storing an unstable-behavior position.

Next, a processing method for the vehicle assist server 10 will be described with reference to the drawings. FIG. 7 is a flowchart showing an exemplary process for storing the unstable-behavior position. The process for storing the unstable-behavior position may be executed whenever the object vehicle data is sent from the object vehicle 2, or may be periodically performed as a batch process based on a plurality of pieces of object vehicle data.

As shown in FIG. 7, the vehicle assist server 10 recognizes the object vehicle data by the object vehicle data recognition unit 11a, in S10 (object vehicle data recognition step). The target vehicle data recognition unit 11a recognizes the object vehicle data sent from the object vehicle 2. The object vehicle data includes the position information about the object vehicle 2 on the map and the traveling state of the object vehicle 2. Thereafter, the vehicle assist server 10 transitions to S12.

In S12, the vehicle assist server 10 determines where the unstable behavior of the object vehicle 2 has occurred, by the unstable-behavior position recognition unit 11b (unstable-behavior determination step). The unstable-behavior position recognition unit 11b determines whether the unstable behavior of the object vehicle 2 has occurred, based on the object vehicle data. For example, the unstable-behavior position recognition unit 11b determines whether the unstable behavior has occurred, by determining whether the slip of the object vehicle 2A has occurred as the unstable behavior, from the wheel speed of each wheel of the object vehicle 2. In the case where it is not determined that the unstable behavior of the object vehicle 2 has occurred (S12: NO), the vehicle assist server 10 ends the current process for storing the unstable-behavior position information. In the case where it is determined that the unstable behavior of the object vehicle 2 has occurred (S12: YES), the vehicle assist server 10 transitions to S14.

In S14, the vehicle assist server 10 recognizes the unstable-behavior position by the unstable-behavior position recognition unit 11*b* (unstable-behavior position recognition step). The unstable-behavior position recognition unit 11*b* recognizes the unstable-behavior position based on the position information about the object vehicle 2 on the map when it is determined that the unstable behavior of the object vehicle 2 has occurred. Thereafter, the vehicle assist server 10 transitions to S16.

In S16, the vehicle assist server 10 performs the process of storing the unstable-behavior position, by the storage processing unit 11*c* (storage processing step). Thereafter, the vehicle assist server 10 ends the current process for storing the unstable-behavior position information.

Figure 8:
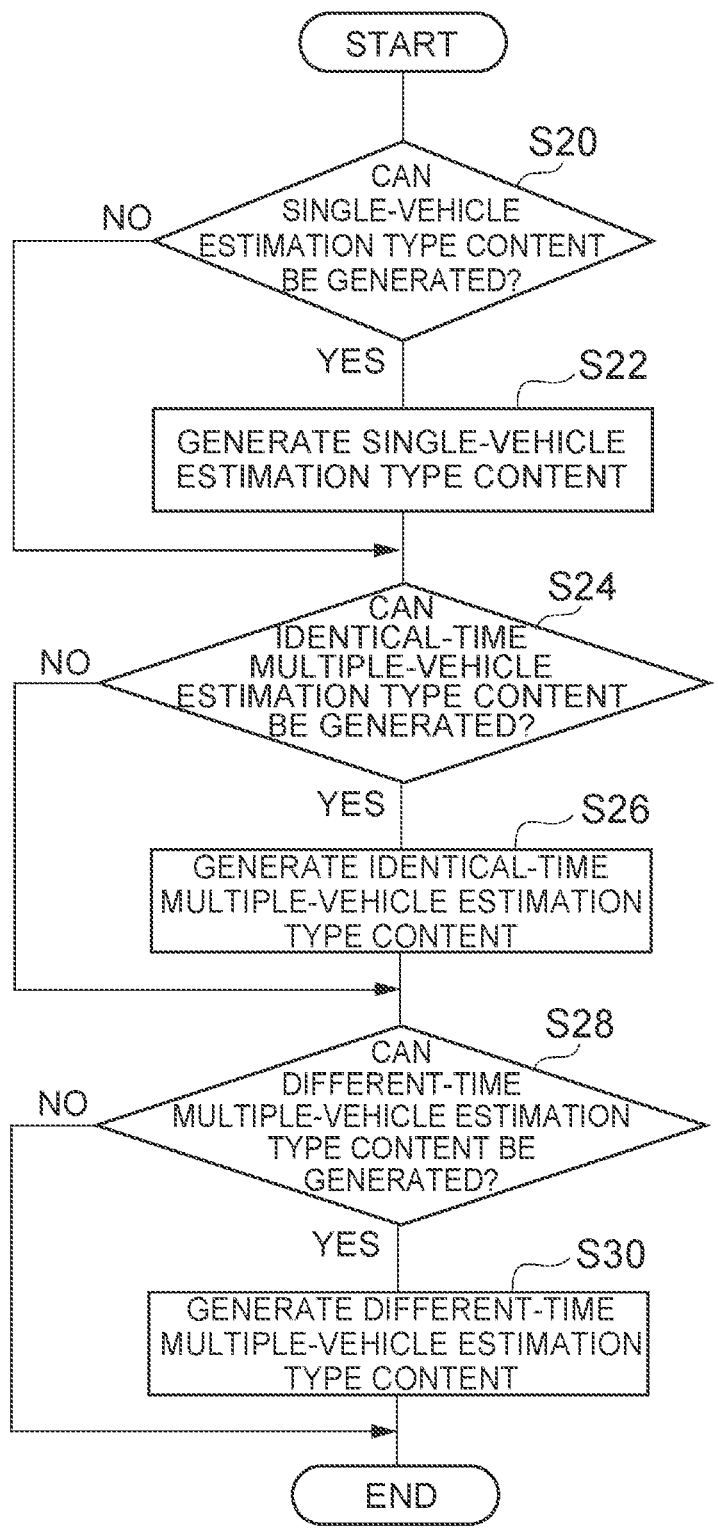
FIG. 8 is a flowchart showing an exemplary assist content generation process.

FIG. 8 is a flowchart showing an exemplary assist content generation process. For example, the assist content generation process is periodically executed.

As shown in FIG. 8, the vehicle assist server 10 determines whether the single-vehicle estimation type content can be generated, by the assist content generation unit 11*d*, in S20 (single-vehicle estimation type content generation determination step). The assist content generation unit 11*d* determines whether the single-vehicle estimation type content for the slip or the like can be generated, based on the object vehicle data. In the case where it is determined that the single-vehicle estimation type content can be generated (S20; YES), the vehicle assist server 10 transitions to S22. In the case where it is not determined that the single-vehicle estimation type content can be generated (S20; NO), the vehicle assist server 10 transitions to S24.

In S22, the vehicle assist server 10 generates the single-vehicle estimation type content by the assist content generation unit 11*d* (single-vehicle estimation type content generation step). Thereafter, the vehicle assist server 10 transitions to S24.

In S24, the vehicle assist server 10 determines whether the identical-time multiple-vehicle estimation type content can be generated, by the assist content generation unit 11*d* (identical-time multiple-vehicle estimation type content generation determination step). The assist content generation unit 11*d* determines whether the identical-time multiple-vehicle estimation type content for the vehicle approach at the time of merging or the like can be generated, based on the object vehicle data. In the case where it is determined that the identical-time multiple-vehicle estimation type content can be generated (S24: YES), the vehicle assist server 10 transitions to S26. In the case where it is not determined that the identical-time multiple-vehicle estimation type content can be generated (S24: NO), the vehicle assist server 10 transitions to S28.

In S26, the vehicle assist server 10 generates the identical-time multiple-vehicle estimation type content by the assist content generation unit 11*d* (identical-time multiple-vehicle estimation type content generation step). Thereafter, the vehicle assist server 10 transitions to S28.

In S28, the vehicle assist server 10 determines whether the different-time multiple-vehicle estimation type content can be generated, by the assist content generation unit 11*d* (different-time multiple-vehicle estimation type content generation determination step). The assist content generation unit 11*d* determines whether the different-time multiple-vehicle estimation type content for the vehicle approach at the time of merging or the like can be generated, based on the object vehicle data. In the case where it is determined that the different-time multiple-vehicle estimation type content can be generated (S28: YES), the vehicle assist server 10 transitions to S26. In the case where it is not determined that the different-time multiple-vehicle estimation type content can be generated (S28: NO), the vehicle assist server 10 ends the current process.

In S30, the vehicle assist server 10 generates the different-time multiple-vehicle estimation type content by the assist content generation unit 11*d* (different-time multiple-vehicle estimation type content generation step). Thereafter, the vehicle assist server 10 ends the current process.

Figure 9:
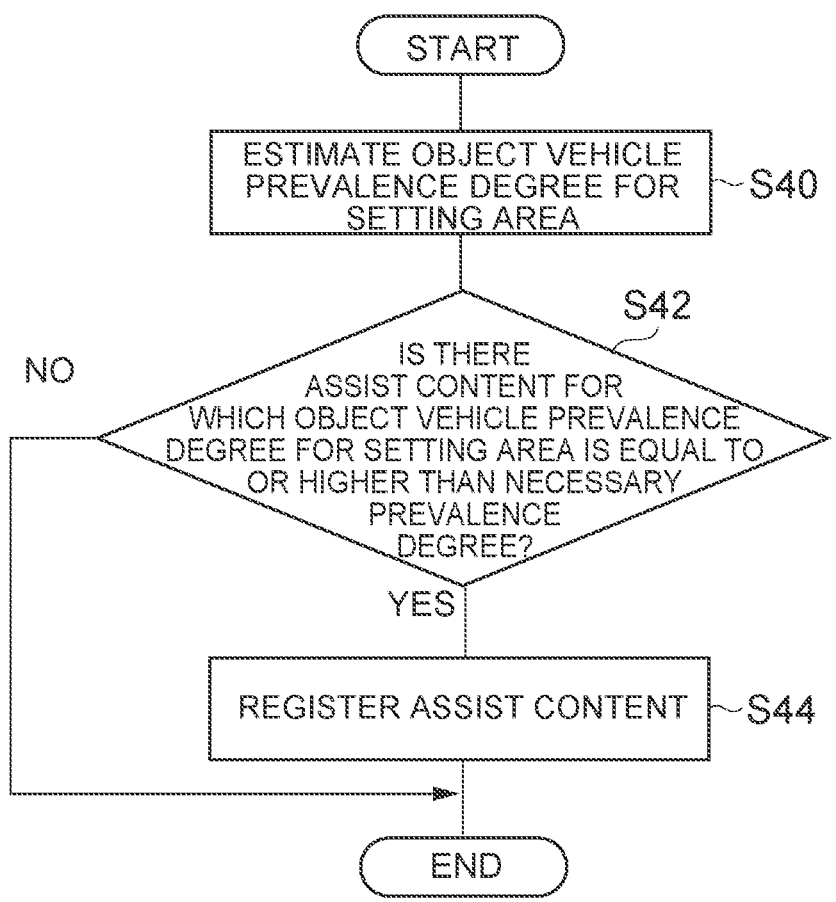
FIG. 9 is a flowchart showing an exemplary assist content registration process.

FIG. 9 is a flowchart showing an exemplary assist content registration process. For example, the assist content registration process is periodically executed, and is performed for each setting area.

As shown in FIG. 9, the vehicle assist server 10 estimates the object vehicle prevalence degree by the prevalence degree estimation unit 11*e*, in S40 (prevalence degree estimation step). The prevalence degree estimation unit 11*e* estimates the object vehicle prevalence degree for each setting area, based on the object vehicle data (including the position information about the object vehicle 2 on the map) for the setting area previously set on the map.

In S42, the vehicle assist server 10 determines whether there is an assist content for which the object vehicle prevalence degree for the setting area is equal to or higher than the necessary prevalence degree, by the prevalence degree determination unit 11*f* (prevalence degree determination step). In the case where it is determined that there is an assist content for which the object vehicle prevalence degree for the setting area is equal to or higher than the necessary prevalence degree (S42: YES), the vehicle assist server 10 transitions to S44. In the case where it is not determined that there is an assist content for which the object vehicle prevalence degree for the setting area is equal to or higher than the necessary prevalence degree (S42: NO), the vehicle assist server 10 ends the current process.

In S44, the vehicle assist server 10 registers the assist content as the provision object in the setting area, in the storage database 15, by the registration unit 11*g* (registration step). The registration unit 11*g* registers the assist content for which the prevalence degree determination unit 11*f* determines that the object vehicle prevalence degree is equal to or higher than the necessary prevalence degree, as the assist content that is the provision object. Thereafter, the vehicle assist server 10 ends the current process.

With the above-described vehicle assist server 10 (the program, and the processing method for the vehicle assist server 10) according to the embodiment, the assist content for which the object vehicle prevalence degree for the setting area is equal to or higher than the necessary prevalence degree is registered in the database as the assist content that is the provision object in the setting area. Therefore, it is possible to avoid the vehicle assist using the assist content based on the object vehicle data from being performed in the setting area for which the object vehicle prevalence degree is not sufficient, and it is possible to restrain the increase in processing load due to the provision of an unnecessary assist content to the object vehicle 2.

In many cases, the single-vehicle estimation type content generated from the object vehicle data about one object vehicle is higher in the need of the vehicle assist than the multiple-vehicle estimation type content generated from the object vehicle data about a plurality of object vehicles. With the vehicle assist server 10, the necessary prevalent degree for the multiple-vehicle estimation type content is higher than the necessary prevalent degree for the single-vehicle estimation type content, and thereby it is possible to preferentially provide the single-vehicle estimation type content to the object vehicle. Furthermore, in many cases, the different-time multiple-vehicle estimation type content generated from the object vehicle data about a plurality of object vehicles that pass through an identical position at different times is higher in the need of the vehicle assist than the identical-time multiple-vehicle estimation type content generated from the object vehicle data about a plurality of object vehicles that exist at an identical position at an identical time. With the vehicle assist server 10, the necessary prevalent degree for the identical-time multiple-vehicle estimation type content is higher than the necessary prevalent degree for the different-time multiple-vehicle estimation type content, and thereby it is possible to preferentially provide the different-time multiple-vehicle estimation type content to the object vehicle.

The embodiment of the present disclosure has been described above. The present disclosure is not limited to the above-described embodiment. In addition to the above-described embodiment, the present disclosure can be carried out as a variety of forms in which various modifications and improvements are performed based on the knowledge of a person skilled in the art.

The assist content only needs to include at least one of the single-vehicle estimation type content, the identical-time multiple-vehicle estimation type content and the different-time multiple-vehicle estimation type content. It is not necessary to distinguish among the single-vehicle estimation type content, the identical-time multiple-vehicle estimation type content and the different-time multiple-vehicle estimation type content.

The assist content does not always need to be generated in association with the position on the map, and the assist content may be generated in association with the vehicle itself or the driver. The necessary prevalence degree of the single-vehicle estimation type content and the necessary prevalence degree of the multiple-vehicle estimation type content may be the same, or the necessary prevalence degree of the multiple-vehicle estimation type content may be lower. The necessary prevalence degree of the identical-time multiple-vehicle estimation type content and the necessary prevalence degree of the different-time multiple-vehicle estimation type content may be the same, or the necessary prevalence degree of the identical-time multiple-vehicle estimation type content may be lower.

In the vehicle assist server 10, the recognition of the unstable-behavior position is not essential. Further, the vehicle assist may be executed by a different server or the ECU of the object vehicle 2.

The invention claimed is:

1. A vehicle assist server that performs a vehicle assist for an object vehicle using a previously generated assist content, based on object vehicle data including a traveling state of the object vehicle and position information about the object vehicle on a map, the vehicle assist server comprising:
a prevalence degree estimation unit configured to estimate an object vehicle prevalence degree for each of a plurality of previously set setting areas, based on the object vehicle data about the plurality of setting areas;
a prevalence degree determination unit configured to determine whether the object vehicle prevalence degree for a corresponding setting area of the plurality of setting areas is equal to or higher than a necessary prevalence degree for each of a plurality of kinds of the assist contents, based on the object vehicle prevalence degree for the corresponding setting area and the necessary prevalence degree, the necessary prevalence degree being previously set for each of the plurality of kinds of assist contents;
a registration unit configured to register the assist content for which the prevalence degree determination unit determines that the object vehicle prevalence degree is equal to or higher than the necessary prevalence degree, in a database, as the assist content that is a provision object in the corresponding setting area; and
an assist content generation unit configured to generate the assist content based on the object vehicle data;
wherein:
the assist content generation unit generates a single-vehicle estimation type content and a multiple-vehicle estimation type content as the assist content, the single-vehicle estimation type content being generated from the object vehicle data about one object vehicle, the multiple-vehicle estimation type content being generated from the object vehicle data about a plurality of object vehicles; and
the necessary prevalent degree for the multiple-vehicle estimation type content is higher than the necessary prevalent degree for the single-vehicle estimation type content.

2. The vehicle assist server according to claim 1, wherein:
the assist content generation unit generates a different-time multiple-vehicle estimation type content and an identical-time multiple-vehicle estimation type content as the multiple-vehicle estimation type content, the different-time multiple-vehicle estimation type content being generated from the object vehicle data about a plurality of the object vehicles that pass through an identical position at different times, the identical-time multiple-vehicle estimation type content being generated from the object vehicle data about a plurality of the object vehicles that exist at an identical position at an identical time; and
the necessary prevalent degree for the identical-time multiple-vehicle estimation type content is higher than the necessary prevalent degree for the different-time multiple-vehicle estimation type content.

3. A non-transitory storage medium storing a program that causes a vehicle assist server to operate, the vehicle assist server performing a vehicle assist for an object vehicle using a previously generated assist content, based on object vehicle data including a traveling state of the object vehicle and position information about the object vehicle on a map, the vehicle assist server operating as:
a prevalence degree estimation unit configured to estimate an object vehicle prevalence degree for each of a plurality of previously set setting areas, based on the object vehicle data about the plurality of setting areas;
a prevalence degree determination unit configured to determine whether the object vehicle prevalence degree for a corresponding setting area of the plurality of setting areas is equal to or higher than a necessary prevalence degree for each of a plurality of kinds of the assist contents, based on the object vehicle prevalence degree for the corresponding setting area and the necessary prevalence degree, the necessary prevalence degree being previously set for each of the plurality of kinds of assist contents;
a registration unit configured to register the assist content for which the prevalence degree determination unit determines that the object vehicle prevalence degree is equal to or higher than the necessary prevalence degree, in a database, as the assist content that is a provision object in the corresponding setting area; and an assist content generation unit configured to generate the assist content based on the object vehicle data;

wherein:

the assist content generation unit generates a single-vehicle estimation type content and a multiple-vehicle estimation type content as the assist content, the single-vehicle estimation type content being generated from the object vehicle data about one object vehicle, the multiple-vehicle estimation type content being generated from the object vehicle data about a plurality of object vehicles; and the necessary prevalent degree for the multiple-vehicle estimation type content is higher than the necessary prevalent degree for the single-vehicle estimation type content.

4. A processing method for a vehicle assist server, the vehicle assist server performing a vehicle assist for an object vehicle using a previously generated assist content, based on object vehicle data including a traveling state of the object vehicle and position information about the object vehicle on a map, the processing method comprising:

a prevalent degree estimation step of estimating an object vehicle prevalence degree for each of a plurality of previously set setting areas, based on the object vehicle data about the plurality of setting areas;

a prevalence degree determination step of determining whether the object vehicle prevalence degree for a corresponding setting area of the plurality of setting areas is equal to or higher than a necessary prevalence degree for each of a plurality of kinds of the assist contents, based on the object vehicle prevalence degree for the corresponding setting area and the necessary prevalence degree, the necessary prevalence degree being previously set for each of the plurality of kinds of assist contents;

a registration step of registering the assist content for which it is determined in the prevalence degree determination step that the object vehicle prevalence degree is equal to or higher than the necessary prevalence degree, in a database, as the assist content that is a provision object in the corresponding setting area; and an assist content generation step of generating the assist content based on the object vehicle data;

wherein:

the assist content generation step generates a single-vehicle estimation type content and a multiple-vehicle estimation type content as the assist content, the single-vehicle estimation type content being generated from the object vehicle data about one object vehicle, the multiple-vehicle estimation type content being generated from the object vehicle data about a plurality of object vehicles; and the necessary prevalent degree for the multiple-vehicle estimation type content is higher than the necessary prevalent degree for the single-vehicle estimation type content.

* * * * *